(12) United States Patent
Thomas et al.

(10) Patent No.: US 8,009,027 B2
(45) Date of Patent: Aug. 30, 2011

(54) CONTACTLESS SENSOR SYSTEMS AND METHODS

(75) Inventors: Michael A. Thomas, Grand Blanc, MI (US); Peter Knittl, Kelheim (DE)

(73) Assignee: Infineon Technologies AG, Neubiberg (DE)

( * ) Notice: Subject to any disclaimer, the term of this patent is extended or adjusted under 35 U.S.C. 154(b) by 832 days.

(21) Appl. No.: 11/444,101

(22) Filed: May 31, 2006

(65) Prior Publication Data

US 2007/0279203 A1 Dec. 6, 2007

(51) Int. Cl.
*B60C 23/00* (2006.01)

(52) U.S. Cl. ......... 340/447; 340/442; 340/445; 340/3.1; 340/425.5; 340/438; 73/146; 73/146.2; 73/146.4; 73/146.8; 701/2; 701/8; 701/9

(58) Field of Classification Search ............ 73/146, 73/146.5, 146.2, 146.4, 146.8; 340/447, 340/442, 438, 425.5, 3.1, 3.4, 10.6, 825.69, 340/870.27; 116/34, 34 R, 58 R; 152/415, 152/151; 701/2, 8, 9, 19, 24, 25

See application file for complete search history.

(56) References Cited

U.S. PATENT DOCUMENTS

| | | | |
|---|---|---|---|
| 6,301,531 B1 * | 10/2001 | Pierro et al. | 701/29 |
| 6,476,712 B1 * | 11/2002 | Achterholt | 340/447 |
| 6,757,521 B1 * | 6/2004 | Ying | 455/67.11 |
| 6,782,739 B2 | 8/2004 | Ratti et al. | |
| 6,825,758 B1 * | 11/2004 | Laitsaari | 340/442 |
| 6,901,066 B1 * | 5/2005 | Helgeson | 370/348 |
| 2003/0006890 A1 * | 1/2003 | Magiawala et al. | 340/438 |
| 2003/0050743 A1 * | 3/2003 | Caretta et al. | 701/1 |
| 2003/0156021 A1 * | 8/2003 | Tabata et al. | 340/442 |
| 2003/0164774 A1 * | 9/2003 | King et al. | 340/870.28 |
| 2005/0088292 A1 * | 4/2005 | O'Brien et al. | 340/443 |

* cited by examiner

*Primary Examiner* — George Bugg
*Assistant Examiner* — Sisay Yacob
(74) *Attorney, Agent, or Firm* — Eschweiler & Associates, LLC

(57) ABSTRACT

A tire monitoring system and associated method is disclosed. The tire monitoring system includes a plurality of tire sensor modules, employing contactless sensors, configured to transmit tire data at a predetermined time interval. The system also includes a central control unit that is configured to receive the tire data from the tire sensor modules, and is further configured with an external control unit that can communicate with the tire sensor modules, the central control units and outside sources.

18 Claims, 10 Drawing Sheets

CONTACTLESS SENSOR SYSTEMS AND METHODS

FIELD OF INVENTION

The invention relates generally to systems and methods for employing contactless tire sensors and, in one example to systems and methods of employing contactless sensors to facilitate efficient and reliable measurement and communication of parameters such a tire parameters in tire monitoring systems.

BACKGROUND OF THE INVENTION

Tragic accidents and injuries due to improperly inflated tires and a large recall of tires in 2000 motivated Congress to take legislative action with regard to tire pressure monitoring in the automotive industry. Congress passed the Transportation Recall Enhancement, Accountability and Documentation (TREAD) Act in late 2000, which requires installation of tire pressure monitoring systems (TPMS). The National Highway Traffic Safety Administration (NHTSA) standard required automotive manufacturers to begin installing monitoring systems on light vehicles. The regulation impacts passenger cars, sport utility vehicles, pickup trucks and mini-vans. Accordingly, efforts continue to be made with respect to designing tire monitoring systems which provide better and more reliable tire data (e.g., temperature, pressure, etc.), to anticipate and prevent tire failures before they occur.

One common cause of tire problems is improperly inflated tires. A tire can lose up to half of its air pressure and not appear to be flat, and therefore unless the tire pressure is being checked on a regular basis, improper inflation can go unnoticed. Under-inflation can result in increased rolling resistance, tire stress, uneven tire wear, wheels being out of balance, decreased mileage, increased heat generation, etc. Over-inflation can cause uneven tire wear, a tire blow-out, and the like. An effective tire monitoring system can address these issues and others.

For example, one tire parameter that has a dramatic effect on tire performance is tire temperature during vehicle operation. Tire temperature can affect tire adhesion, tire wear characteristics, vehicle handling performance, fuel efficiency, and the like. Systems for monitoring vehicle tire parameters are known in the automotive industry. In such tire monitoring systems, tire temperature sensor(s) and radio frequency (RF) transmitters are mounted inside and in contact with each tire, typically adjacent the inflation valve stem. In one prior art system implementation, the tire temperature sensed by the temperature sensor is sent by a transmitter to a central receiver/controller located on-board the vehicle. The temperature information is delivered to the receiver/controller by RF signals and is subsequently converted to a pressure and conveyed to a vehicle operator, typically in the form of a visual display. This approach, however, has several potential shortcomings. First, the temperature sensor in contact with the tire measures only the immediate ambient temperature (a single temperature point), local to the sensor, so that an inaccurate or non-representative temperature reading acquired and thus correlated to an inaccurate pressure. Second, even though a vehicle occupant is provided with a warning light, often times the warning, is ignored and no subsequent action is taken.

In another prior art example, the tire pressure monitoring system uses pressure sensors in each tire for determining whether a tire is under-inflated, over-inflated or properly inflated. However, the monitoring system does not provide an indication of other potential problems such as the presence of imbedded foreign objects such as nails, treads that are excessively worn, delamination of the tire treads or impending catastrophic failure of the tire.

Thus, there exists a need for an improved system and method for remote monitoring of tire temperature, tire pressure and other tire parameters.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The invention, in one embodiment, is directed to a tire monitoring system and method for vehicles that employs contactless sensors to acquire and/or communicate multiple tire data points. The contactless sensor(s) are housed within a tire sensor module that is configured to store the multiple tire data points and/or communicate the multiple tire data points with a central control unit.

The following description and annexed drawings set forth in detail certain illustrative aspects and implementations of the invention. These are indicative of only a few of the various ways in which the principles of the invention may be employed.

DETAILED DESCRIPTION OF THE INVENTION

Figure 1:
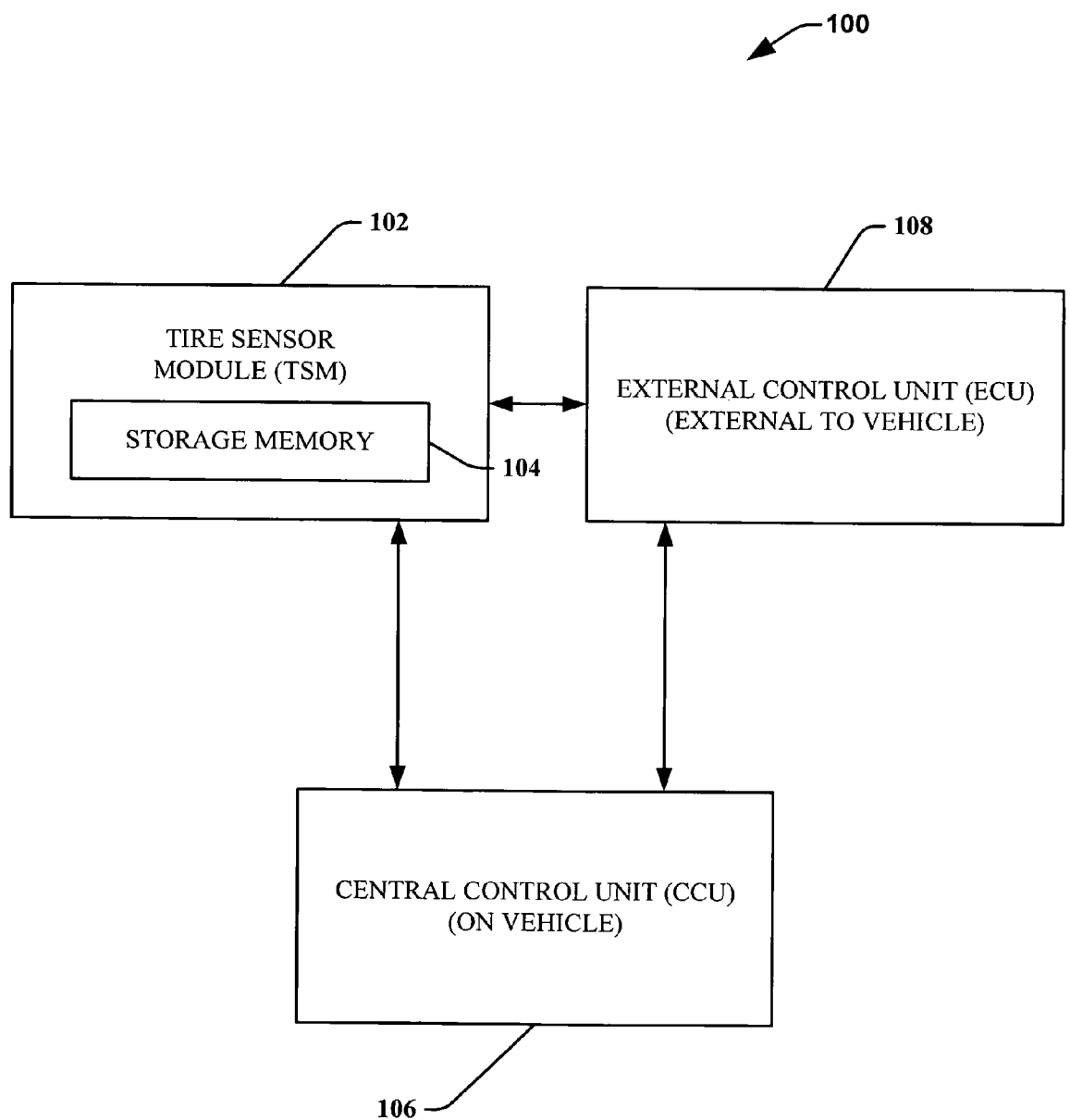
FIG. 1 is a system level block diagram illustrating a system for acquiring and transmitting tire data for a vehicle according to one embodiment of the invention.

One or more implementations of the invention will now be described with reference to the attached drawings. The invention relates to a monitoring system and associated method wherein tire data is acquired and transmitted from one or more sensor modules to a central control unit and/or an external monitoring unit in a reliable and efficient manner. In one particular embodiment the invention relates to a tire monitoring system and associated method.

The invention, in one embodiment, is directed to an improved system and method of collecting and transmitting data in a monitoring system, such as tire data in a tire monitoring system of a vehicle, e.g., an automobile, a truck, a bus, a van, a recreational vehicle, a motorcycle, a go-cart, a race car, an earth mover, a crane, a backhoe, a Humvee, a troop transport, a fire truck and the like. It is to be appreciated that although this disclosure applies to a vehicle employing rubber tires, it can equally apply to any system that remotely monitors temperature, pressure, etc., for example, a pressurized heating system in a remote location, a robotic manufacturing area, a locomotive, a track driven armored vehicle, etc.

In one embodiment, the invention relates to an improved tire monitoring system and design for determining tire conditions by employing contactless sensors in tire sensor modules configured with central control units and notifying the appropriate personnel if an unsafe condition occurs, utilizing an external control system. Contactless sensors are defined as devices that are not in contact with the surface on which the chosen parameter is being measured. A list of contactless sensors includes but is not limited to: anomorphic beam-conditioning optic sensors, angular sensors, barcode scanners, bifurcated optical fiber bundle sensors, capacitive angular-position sensors, charge-coupled device chemical sensors, chips, coupling linear movement sensors, depth mapping sensors, dimensional metrology sensors, displacement sensors, fringe projection sensors, gas detection sensor, high-resolution fiber optic sensors, holographic interferometry sensors, image sensors, inductive switches, inductive sensors, inductive switches, infrared sensors, iris scanning sensors, diodes, scanners, sensors, load sensors, optical encoders, magnetic strip sensors, piezoelectric effect sensors, photo sensors, photoelectronic sensors, pulse wire sensors, permanent magnet linear contact-less displacement (PLCD) sensors, pressure sensors, proximity sensors radio frequency sensors, reed switches, RFID sensors, shank-based system sensors, shearography sensors, sub-micron measurement sensors, surface wave sensors, 3D control sensors, temperature sensors, torsion sensors, and ultrasonic sensors.

The invention in this embodiment makes use of the contactless sensors to determine tire temperature, pressure, tire loading, tire symmetry, and/or other key tire characteristics, for example, flat spots, out-of-round conditions, tire re-tread de-lamination, tire wobble, tire defects, foreign objects in tires (e.g., a nail), tire failure, and the like. The invention in another embodiment also makes use of predictive analysis to determine or predict when an unsafe condition will occur, e.g., when the tires need replacing based on the tire history for a specific vehicle, when the tire treads will be out of spec., etc.

Another embodiment of the invention relates to a tire monitoring system design. The tire monitoring system employs and is associated with one or more contactless sensors operable within a tire sensor module. The tire sensor modules are associated with a tire and/or a tire location on a vehicle and configured to acquire tire data associated therewith. The tire monitoring system also employs a central control unit that is communicatedly coupled to the various tire sensor modules, and configured to transmit and receive data thereto. The central control unit is also configured in one embodiment to set a predetermined time interval at which the tire data is to be transferred, thereto. More particularly, the central control unit is operable to dictate predetermined time intervals for multiple tire sensor modules (when employed) such that the predetermined time intervals are unique and do not overlap one another in absolute time. Utilizing this approach, tire data collisions at the central control unit are eliminated.

In accordance with yet another embodiment of the invention, the tire monitoring system further comprises one or more external control units operably associated with the central control units of multiple vehicles and the associated tire sensor modules. In addition, the external control units can order decided time intervals, when the central control units and/or the tire sensor modules will communicate with the external control units, and determine whether a specific central control unit or tire monitoring system is authorized to communicate with the external control units. In this way, data collisions between the external control unit, the central control units and tire sensor modules are done away with. The external control unit in one embodiment of the invention has the highest level of authority in terms of communication with respect to the central control unit and the tire sensor module. The central control unit has the second highest level of communication authority and the tire sensor module the lowest level of authority.

In accordance with another embodiment of the invention, a system for identifying a location of the various tire sensor modules associated with the vehicle is provided. The central control unit is physically located in the vehicle and receives data from the various tire sensor modules mounted on the vehicle frame. For example, the central control unit may receive infrared thermal data associated with each tire. By comparing a thermal signature from each of the tire sensor modules to the data stored in the central control unit, the central control unit is able to identify a location of the tire sensor modules and/or the tires by evaluating the thermal signature of the data received to the thermal signature stored in the central control unit's memory.

Turning to FIG. 1, in one embodiment of the invention, a block diagram illustrates a tire monitoring system 100, wherein one of one or more tire sensor modules (TSM) 102 with storage memory 104 associated therewith can be operably associated with a central control unit (central control unit) 106 mounted on the vehicle. In one embodiment the system may further include an external control unit (ECU) 108 that is outside or peripheral to the vehicle. In one example, each tire of a vehicle has a TSM 102 associated therewith, wherein the tire sensor module 102 is configured to acquire one or more tire parameters (e.g., tire pressure, tire temperature, tire loading, etc.), and transmits the tire data to the central control unit 106. In the embodiment of FIG. 1, each tire sensor module 102 comprises a battery that is operable to provide power to various tire sensor module components. The tire sensor module 102 further comprises a parameter sensor such as an IR temperature sensor that is powered by the battery and configured to measure directly or indirectly a tire parameter (in one example, tire temperature), and provide such data to a tire sensor module controller within the module and store the data in the storage memory 104 of the tire sensor module 102. The tire data includes, but is not limited to, for example, temperatures, pressures, positions, velocities, accelerations, torques, angles, barcode information, depths, gas properties, chemicals, forces, moments, magnetic fields, ultrasonic measurements, and strains.

In yet another embodiment, the tire sensor module 102 can also be operably coupled to the external control unit 108 and configured to transfer the acquired tire data to the external control unit 108 based on, for example, proximity of the tire sensor module 102, external control unit authorization, available storage memory 104, and the like. As will be further discussed in greater detail below, a clock circuit can operate to dictate a timing in which acquired tire data can be transmitted from a tire sensor module transceiver via an TSM antenna to the central control unit 106 mounted on the vehicle. In one embodiment of the invention, the TSM 102 transceiver and the central control unit 106 antenna can cooperatively operate to transmit tire data wirelessly at any suitable UHF frequency, for example, in one embodiment about 315 MHz.

In another embodiment of the invention, each tire sensor module 102 employed in the tire monitoring system 100 can be operable to enter a low power mode, wherein the power of the battery can be minimized and thus conserved. In one example, in the low power mode, all the components except for the clock circuit are switched off. The clock circuit, upon reaching a predetermined time interval (as will be discussed and more fully appreciated infra), can activate the other components, wherein, for example, the infrared sensor acquires, for example, tire temperature data, distance measurements, and the like, transferring such data to the central control unit transceiver via the tire sensor module controller. In one example, a contactless tire parameter sensor only acquires tire data during the respective predetermined time interval, however, in alternative embodiments the sensor may periodically activate, acquire data and save such data locally, either at the TSM 102 in the storage memory 104 or in the central control unit 106. Subsequently, during the predetermined time interval, multiple segments of tire data can be transmitted. It is to be appreciated, that although this disclosure refers to contactless sensors, the invention can make use of contact type sensors as well, for example, load cells, thermocouples, and the like.

In yet another embodiment of the invention, the predetermined time interval between measurements can be increased when it has been determined that the tire performance has degraded to a predetermined threshold level, for example, the tire tread has reached a given minimum thickness, the tire IR temperature reading indicates "hot spots", and the like. In other words, when the likelihood of a tire failure has increased, the number of measurements per a given time can also be increased, so that the driver can be warned of a possible catastrophic failure (e.g., a tire blowout) prior to the occurrence of such an event. This can allow the tires to be changed out based upon scheduled maintenance rather than more costly unscheduled failures. Tire data or "data" can also include, but not be limited to the following: a properly inflated tire, an under-inflated tire, an over-inflated tire, a de-laminating tire re-tread, an unbalanced load in a vehicle, a tire that needs to be replaced, an unbalanced tire, exposed ply, tire bulge, a bald tire, insufficient treads, a foreign object embedded in tire, a tire out-of-round condition, an over heating tire, tire flat spots, tire overloading, tire structural defects, exceeding a tire's rated speed, tire installation errors, tire leaks, parking on too steep an incline, an incorrect tire or combinations therewith.

In one embodiment of the invention, the TSM 102 transceiver can contain a modulator/demodulator that can be configured to receive the tire data and modulate such data for UHF transmission. In one embodiment of the invention, tire data can be frequency modulated and converted for transmission to the central control unit 106.

The central control unit (central control unit) 106, in another embodiment of the invention, can comprise a transceiver that can be configured to receive transmitted tire data from various tire sensor modules 102 via an antenna. The central control unit 106 transceiver can contain a modulator/demodulator that, upon receipt of the tire data, demodulates the data and provides such demodulated data to a central control unit controller. The central control unit controller, in one embodiment, comprises a master clock, which may be called a real-time clock (RTC) that can be employed by the central control unit controller for synchronizing the clock circuits of the various tire sensor modules 102 thereto. The clocks can be synchronized to both the central control unit 106 and the various tire sensor modules 102 to operate synchronously with respect to the transmission and receipt of the tire data, as well as with respect to other information.

In yet anther embodiment of the invention, the central control unit controller 106 can be operably coupled to a vehicle bus interface that can be operably associated with the central control unit controller via a vehicle bus. For example, if the central control unit receives tire data from one or more of the tire sensor modules 102 that are outside a prescribed range, the controller may send an alarm or status message over the vehicle bus for communication of the status condition to a user, for example. Each of the central control unit components can be coupled to the vehicle battery via a voltage regulator in order to prevent voltage or current swings due to changed loading, etc.

In accordance with one embodiment of the invention, the central control unit 106 can be configured to assign unique predetermined time intervals to each of the tire sensor modules 102, wherein each of the predetermined time intervals are at different times and do not overlap one another in the time domain. Such time intervals can then be employed by each tire sensor module 102 to awaken from a low power mode, acquire tire data, and transmit such tire data back to the central control unit 106. By having each predetermined time interval unique, tire data collisions will not occur at the central control unit. Consequently, the invention eliminates the inefficient conventional anti-collision algorithms, wherein various modules send multiple blocks of redundant data, etc. In addition, since each block of data need only be sent once during a predetermined time interval, reduced electromagnetic transmissions occur, which may be advantageous in complying with various emission regulations in certain regulatory jurisdictions. Further, since each tire sensor module 102 has a predetermined time allocated thereto, the various components associated therewith can be switched off (except for the clock circuit), so that minimal current is drawn from the battery, thereby substantially improving the life of the various tire sensor modules 102.

In addition in an alternative embodiment of the invention, the external control unit 108 can be configured to be functionally connected to the vehicle bus interface that can be operably associated with the central control unit controller and a tire sensor module controller via the vehicle bus. For example, if the external control unit is within range of a CCU 106 on a vehicle, the ECU 108 can request to receive tire data from the central control unit 106 and/or one or more tire sensor modules 102. The central control unit 108 can be coupled to an external power source via a voltage regulator in order to prevent voltage or current swings due to, for example, vehicle startup, etc. The central control unit can transmit a signal at a predetermined time, for example, when the vehicle has returned to a rental location, the central control unit 108 can determine if the engine on that vehicle has been off for thirty minutes and if that condition has occurred, the CCU 108 can transmit a signal to determine if there is an external control unit 108 within range. If there is an external control unit 108 within range, the central control unit 106, for example, can initiate communication with it.

In yet another embodiment, numerous vehicles, for example, a fleet of rental cars can be returned to a single location where all vehicle central control units 106 (authorized to communicate with external control unit) can be queried by the external control unit 108 to, for example, either download and store data in an external database, wherein such data may be employed to determine those vehicles that require tire maintenance, for example, to identify those vehicles that should be scheduled for tire replacement in the near future based on predictive analysis, etc.

In accordance with yet another embodiment of the invention, the external control unit 108 can be configured to determine a unique predetermined vehicle number associated with each vehicle in a fleet. The external control unit 108 can then assign unique predetermined time intervals to each of the central control units 108 on each of the vehicles, wherein, in one example, each of the predetermined vehicle time intervals are at dissimilar times and are not overlapping each other in absolute time. Such time intervals can then be utilized by each central control unit 108 on each vehicle to transmit specific vehicle tire data to the external control unit 108, and the like. By each vehicle central control unit 106 having each predetermined time interval unique, central control unit tire sensor data transmission conflict will not occur between the various vehicles. As a consequence, the invention can more effectively provide data transmission, eliminate or reduce wasted transmission time, etc. An added advantage of the invention, whereas a single individual can often ignore a warning on the vehicle dashboard, e.g., regarding tire pressure, the pressure data will less likely be ignored if it is reported, at the fleet level, to numerous individuals responsible for vehicle maintenance, and the like.

Figure 2:
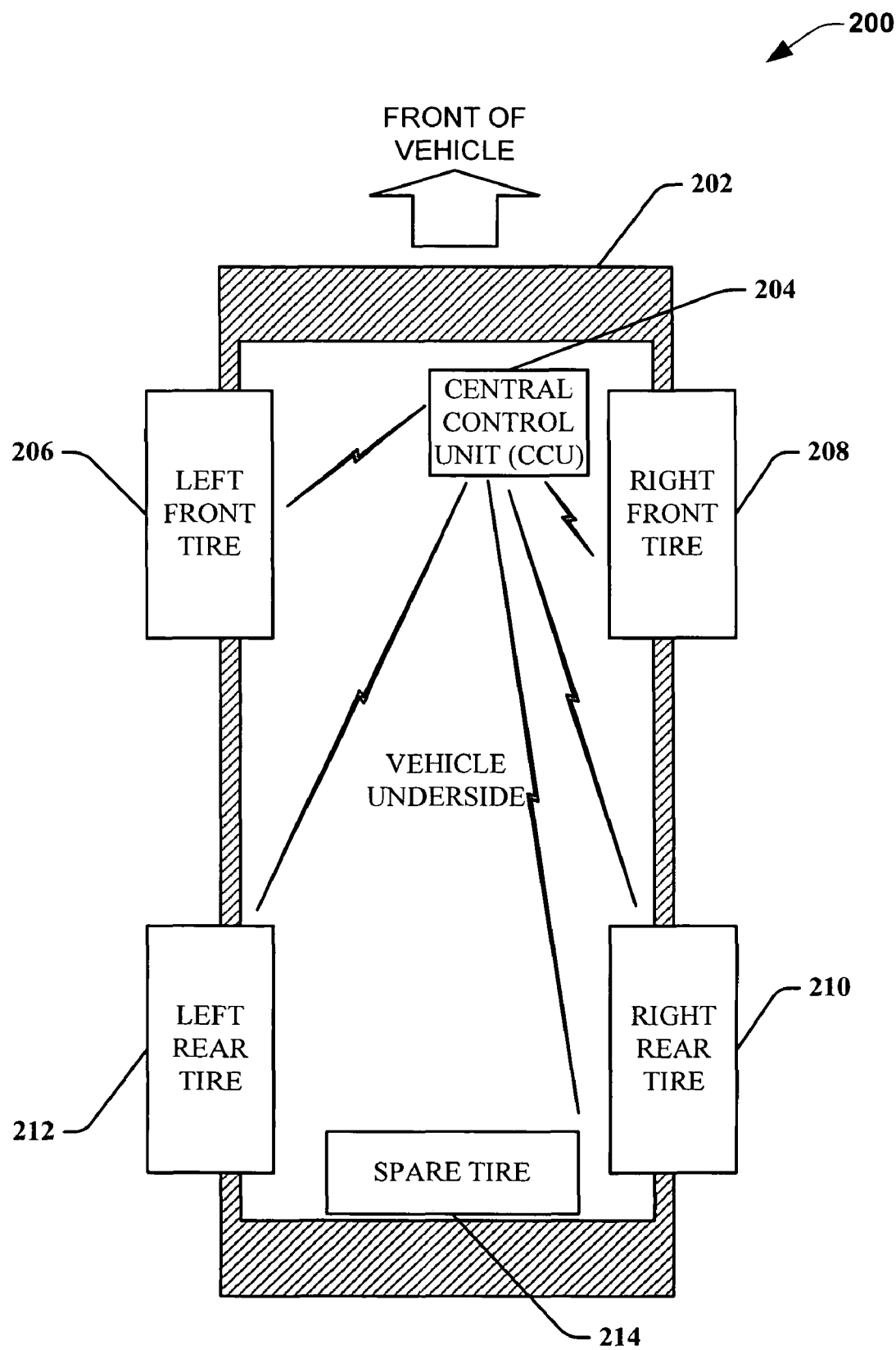
FIG. 2 is a plan view of a vehicle having tire sensor modules and a central control unit associated therewith, wherein tire data is communicated to the central control unit according to an embodiment of the invention.

Referring now to FIG. 2, in another embodiment of the invention, a vehicle tire monitoring system 200 that can be employed in connection with one or more vehicles is illustrated. The vehicle tire monitoring system 200 can be a part of the vehicle 202 and can include various tire sensor modules and a central control unit 204. In one embodiment, a left front tire 206, a right front tire 208, a right rear tire 210, a left rear tire 212 and a spare tire 214 can have associated contactless sensors mounted, for example, within the tire on the tire rim, mounted within wheel wells on the vehicle, within the actual tire treads, and the like. The spare tire 214 can be supplied with the same sensors as the other tires, except, those sensors mounted proximate to the tire assembly. Once the spare tire replaces another tire on the vehicle, for example, due to a flat tire, any sensors, on the vehicle associated with the tire location, where the spare is moved, become associated with the spare tire 214.

In accordance with yet another embodiment of the invention, the central control unit 204 can communicate with the tire sensor modules by employing, for example, wireless communication, etc. The tire sensor data can be shared employing a variety of mediums, the Internet, hard wiring, Blue-tooth, ultra-wide band, etc. The contactless sensors that can be utilized are, for example, infrared sensors, sensors, RFID, scanners, ultrasonic sensors, inductive sensors, photoelectronic sensors, pulse wire sensors, permanent magnet linear contact-less displacement (PLCD) sensor, proximity sensors, and the like.

In one embodiment of the invention, each tire of a vehicle 202 has a specific tire sensor module associated therewith, wherein the specific tire sensor module can be configured to acquire one or more tire parameters (e.g., a tire pressure), and transmit the tire data to the central control unit 204. In yet another example, if the right front tire 208 begins to fail, or shows indications that it may fail at some future time, the driver can be alerted with a dashboard signal that "Right Front Tire needs to be replaced", for example. In another example if the right rear tire 210 has been replaced, the central control unit 204 can determine that the tire has been replaced, as discussed infra, and alert the service personnel that the tire was changed. In addition, the central control unit can determine that spare tire 214 is missing and inform the customer or maintenance personnel of that condition and/or alternatively, an alarm can be generated, a visual display can be presented, a voice message can be created, and the like.

Figure 3:
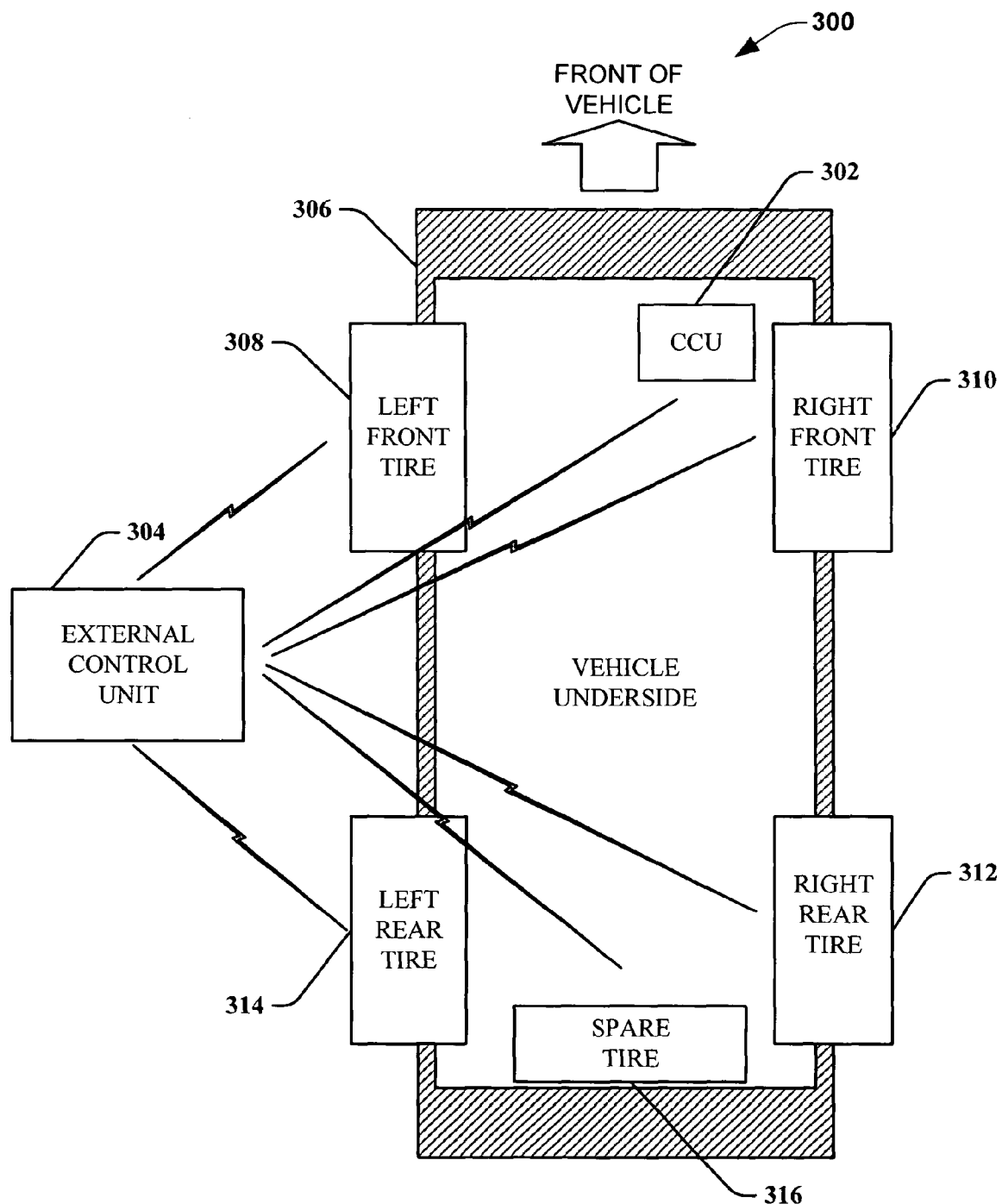
FIG. 3 is a plan view of a vehicle having tire sensor modules, a central control unit and an external control unit associated therewith, according to an additional embodiment of the invention.

Referring to FIG. 3, an external vehicle tire monitoring system 300 that can be employed in a rental car environment is illustrated to aid in recognizing tire conditions in order to take corrective actions, if necessary. An external vehicle tire monitoring system 300 can comprise a central control unit (CCU) 302 mounted on the vehicle 306 that can be authorized to communicate with an external control unit 304 and various tire sensor modules mounted, for example, within or near the various tires, a left front tire 308, a right front tire 310, a right rear tire 312, a left rear tire 314, and a spare tire 316, respectively. For example, the central control unit 302 on the vehicle may be authorized to communicate with the external control units 304, for example, at multiple rental car locations.

In one embodiment, the external control units 304 at each location can be operably coupled to an external power source, for example, 120 volts AC, 240 volt AC, and the like, and each external control unit 304 is configured to receive the tire data from all of the central control units 302 associated with the various vehicles at the first location that are authorized to communicate with the external control unit 304. The external control unit 304 can be designed so that it can determine what specific vehicles are on the lot at a given time based, for example, on a unique vehicle identifying number. The vehicle number can be read by the external control unit 304 utilizing, for example, RFID tags, barcode readers, magnetic strips, wireless communication and the like, associated with a specific vehicle and central control unit 302.

In one embodiment of the invention, an optimized vehicle algorithm can be employed to determine the optimum approach to downloading central control unit 302 tire data from the various vehicles, based on factors, e.g., priority, vehicles reserved by customers for the following day, vehicles associated with the central control units 302 that have lowest battery power, vehicles associated with the central control units 302 that have highest reported tire anomalies, etc. The external vehicle tire monitoring system 300 has benefits over conventional tire monitoring systems, as the tire data can be downloaded and reviewed by an organization rather than an individual and therefore can be less likely ignored if a hazardous condition is identified. In more detail, the external control unit 304 can operate on standard power as opposed to the battery power and therefore the data can be received and stored more reliably. Furthermore, in the event of a tire anomaly on a vehicle, the system has more communication paths available, for example, an alarm could be sounded, a blinking light could indicate the vehicle number and the tire(s) that need to be replaced, an e-mail could be sent to a manager, a report could be generated, a warning light could be activated in the vehicle when it is turned on, etc. In operation, the vehicle tire monitoring system 300 can help maintenance personnel to schedule and perform preventative maintenance on a vehicle rather than performing more expensive unscheduled maintenance.

Figure 4:
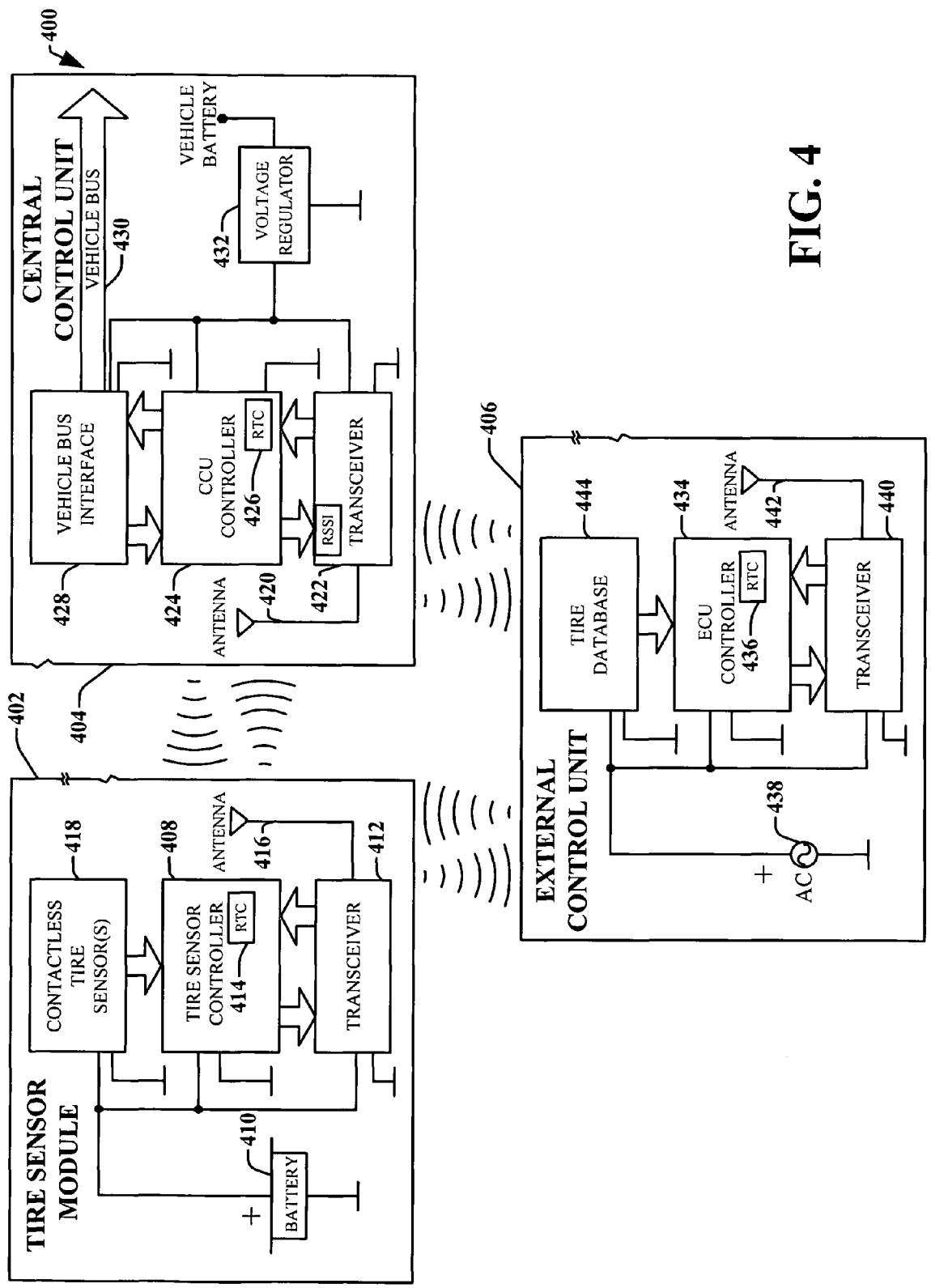
FIG. 4 is a system level block diagram illustrating a tire monitoring system, in accordance with another embodiment of the invention.

FIG. 4 illustrates a system 400 of devices, each configured to implement tire monitoring of at least one vehicle according to one embodiment of the invention. A tire sensor module 402 can be part of a wired and/or wireless network of devices that share tire data and each tire sensor module can store various pieces of tire data therein. Each tire sensor module 402 on the at least one vehicle can communicate with a central control unit 404 located on the at least one vehicle. The tire sensor module 402 and the central control unit 404 can communicate in one embodiment with an external control unit 406, however this option is not required by the invention. The TSM module comprises a TSM controller 408 that can be operably joined to, for example, a re-chargeable battery 410, and can be arranged to transmit the obtained tire data to a TSM transceiver 412 based on predetermined timing as provided or ascertained by a TSM clock circuit 414 (or real-time clock (RTC)). In the above example, the TSM clock circuit 414 can be a part of the tire sensor module controller 408, however, it should be understood that in alternative embodiments the TSM clock circuit 414 may be a separate device or associated with another component in accordance with the invention. As will be further discussed in greater detail below, the TSM clock circuit 414 can operate to dictate a timing in which acquired tire data can be transmitted from the TSM transceiver 412 via an TSM antenna 416 to the central control unit 404 located on the at least one vehicle. In one embodiment of the invention, the TSM transceiver 412 and TSM antenna 416 can cooperatively operate to transmit tire data wireless at a UHF frequency, for example, about 315 MHz. The contactless tire sensor(s) 418 can be at least one of the following: temperature sensor, pressure sensor, RFID, proximity sensor, infrared sensors, sensors, surface wave sensors, piezoelectric effect sensors, scanners, ultrasonic sensors, torsion sensors, load sensors, image sensors, inductive sensors, photoelectronic sensors, encoders, chemical sensors, pulse wire sensors, permanent magnet linear contact-less displacement (PLCD) sensor, proximity sensors, and the like.

In yet another embodiment of the invention, each tire sensor module 402 employed in the tire monitoring system 400 may be operable to go into a conservation power mode, wherein the power draw on the battery 410 is minimized and accordingly conserved. In one example, in the conservation power mode, all the components except for the TSM clock circuit 414 are switched off. The TSM clock circuit 414, upon reaching a predetermined time interval (as will be discussed and more fully appreciated infra), activates the other components, wherein, for example, the IR temperature sensor acquires tire temperature data and transfers such data to the TSM transceiver 412 via the tire sensor controller 408. In one example, the contactless tire sensor 418 can acquire tire data during the respective predetermined time interval, however, in alternative embodiments the sensor may occasionally turn on, obtain data and save such data locally. Subsequently, during the predetermined time interval, multiple segments of tire data and/or tire anomaly data may be transmitted to a local memory associated with the transceiver 412.

In yet an additional embodiment of the current invention, the TSM transceiver 412 can contain a modulator/demodulator that can be arranged to receive the tire data and modulate such data for UHF transmission. In a further embodiment of the invention, the tire data, for example, can be frequency modulated (or amplitude modulated, or both) and converted for communication to the central control unit 404.

In another embodiment, the central control unit (CCU) 404 can comprise a central control unit transceiver 422 that is configured to obtain transmitted tire data from the diverse tire sensor modules 402 via a central control unit antenna 420.

The central control unit transceiver 422 can include a modulator/demodulator that, upon receipt of tire data, demodulates the data and provides such demodulated data to a central control unit controller 424. The central control unit controller 422, in one embodiment, comprises a central control unit master clock 426 (a real-time clock (RTC)), that can be engaged by the central control unit controller 424 for synchronizing the clock circuits of the various tire sensor modules 402, thereto. Since, in one example, such tire sensor module and central control unit clocks, 414 and 426, are synchronized, both the central control unit 404 and the various tire sensor modules 402 can operate in synch with respect to the transmission and receipt of data.

In yet another embodiment, the central control unit 404 can include a central control unit vehicle bus interface 428 that is operably associated with a central control unit controller via a central control unit vehicle bus 430. For example, if the central control unit controller 424 receives tire data from one or more tire sensor modules 402 that is outside a prescribed range, the controller 424 may send an update or warning alert over the central control unit vehicle bus 430 for communication of the status condition to a user, for example. Each of the central control unit components can be coupled to the vehicle battery via a voltage regulator 432 in order to prevent voltage or current spikes.

In another embodiment, the tire sensor modules 402 and/or the central control units 404 can be operably coupled to the external control unit(s) 406 that are within range of the at least one vehicle. A synchronization algorithm can, for example, be employed within an external control unit (ECU) controller 434 to synchronize an external control unit real time clock (RTC) 436 with the TSM clock 414 and/or the central control unit clock 426. By employing the synchronization algorithm the various clocks 414, 426 and 436 are synchronized which can allow, for example, the transmission, receipts, storage, etc., of data by the tire sensor modules 402, the various central control units 404 and the external control unit 406. In yet another embodiment, the external control unit 406 can identify and communicate with several vehicles when the vehicles are at a single location. As an example of this process, the external control unit 406 can receive AC power 438 at a rental car return location and can communicate with the vehicles transmitting and receiving tire data utilizing the external control unit transceiver 440 and the external control unit antenna 442. The tire data can be stored in the external control unit tire database 444, which, employing an algorithm can determine what action needs to be taken based on the tire data, for example, tires can be inspected, tires can be replaced, tire condition can be recorded, etc.

In yet another embodiment of the invention, the tire data collected can be analyzed using predictive analysis in order to optimize tire life. The data stored in the external control unit 406 can be employed with an analysis component to determine, for example, the optimum time to rotate tires, the number of warnings that have occurred with a specific tire, the tread life of a specific tire, etc. It is to be appreciated that, although a contactless sensor is disclosed herein, contact sensors can be used as well in combination with the contactless sensors or stand alone sensors.

Figure 5:
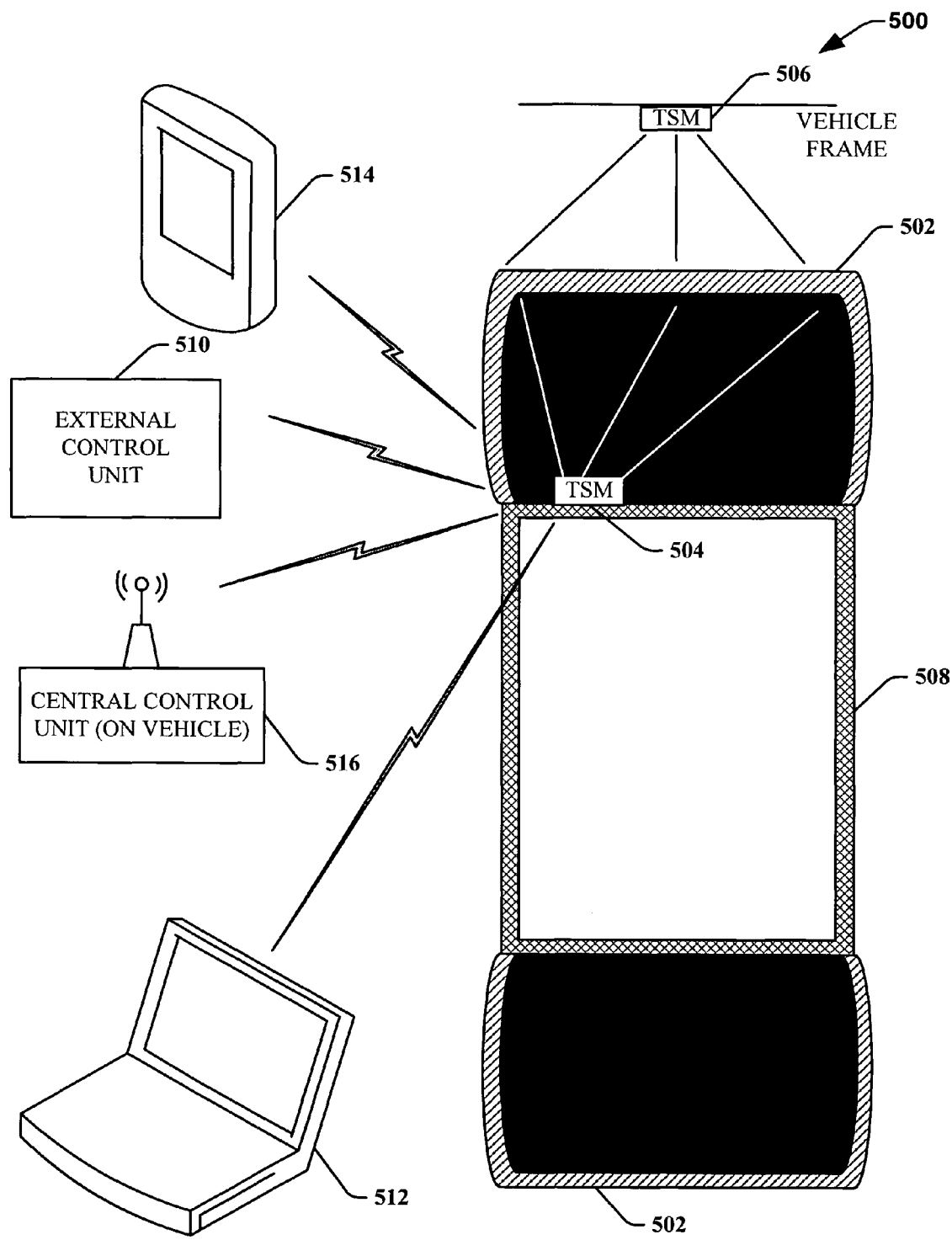
FIG. 5 is a schematic cross-sectional view of a tire, illustrating tire sensor modules according to another embodiment of the invention.

Turning to FIG. 5, an system is illustrated employing the one or more embodiments disclosed herein in a tire monitoring system 500. It should be appreciated that the system 500 is provided to facilitate understanding of the various embodiments and not to limit the scope thereof. System 500 can include a network, for example, the Internet, Ethernet, etc. The data sent across the network can be stored in an external database, for example, at a world headquarters for a trucking company. The tire 502 can include a tire sensor module 504, for example, mounted inside the tire on the tire rim 508. The tire sensor module 502 can communicate with various devices including a central control unit 516 mounted on a vehicle, an external control unit 510 discussed supra, a laptop computer 512, a PDA 514, etc. In addition the devices can include cell phones, programmable logic controllers (PLC), computers, radios, data scanners, etc.

In one particular embodiment of the invention, the TSM modules 504 and 506 can employ contactless sensors, indicated by lines emanating from the TSM 504 and 506. These contactless sensors can include the following: IR sensors, inductive sensors, sensors, rotary sensors, position sensors, magnetic sensors, Hall effect sensors, chemical sensors, gas sensor arrays, ultrasonic sensors, microwave sensors, Doppler sensors, and the like. For example the sensors can be six Infrared sensors distributed equally, for example, among the tire sensor module 504 mounted within the tire 502 on the tire rim 508 and the tire sensor module 506 mounted on the vehicle frame. The TSM 506 mounted on the frame can be designed with a shield, in such a way to minimize road debris from interfering with the sensors. The three IR sensors of TSM 506, for example, can be directed at the inside edge, outside edge and center of the tire 502. The three external sensors can measure, for example, temperature, distance, etc., around 360° of the tire's circumference. This data can be utilized with an algorithm to determine: tire under-inflation, tire over-inflation, tire flat spots, tire anomalies, tire wear patterns, likelihood of tire blow out, vehicle load conditions, foreign objects embedded in the tire (e.g., a nail), tire tread remaining, tires out of balance, proper tire rotation, tires out of round, whether a tire retread is about to break away, and the like.

For yet another embodiment, the tire sensor modules 504 and 506 can be employed to determine if a re-treaded truck tire is about to lose the tire re-tread. A central controller unit on the truck can compare (real time) temperatures from the IR sensors on the TSM 506 mounted outside the tire on the vehicle frame, for example, with the temperatures obtained from the IR sensors that are part of TSM 504 mounted inside the tire on the tire rim. If the tire re-tread is firmly attached to the base tire the temperature differential may remain steady due to a uniform conduction path. As the tire begins to delaminate a gap can be formed between the tire re-tread and the base tire, which can result in a greater temperature differential, indicating the tire re-tread is beginning to separate from the tire. The system can also determine how long the tire re-tread lasted, before delaminating, based on the time it was installed vs. the time it delaminated. It is to be appreciated that the sensors in the outer TSM 506 measure a parameter, e.g., distance to the tire, temperature of the tire surface, etc., circumferentially, in other words, 360° around the surface of the tire. Whereas, the sensors of the TSM 504 mounted to tire rim each measure one specific area on the inside of the tire. Sensors can be mounted in various locations in order to obtain the necessary and desired tire parameters.

In another embodiment, a or ultrasonic sensor can be employed in the inside tire sensor module 504 to determine if the tires are under-inflated, over-inflated or properly inflated. The sensor can be made to point directly at the center of the tire 502 that makes contact with the road. If the distance from the TSM 504 to the tire center increases (e.g., calibrated for the correct pressure) the tire can be over inflated, and if the distance is less that the calibrated distance the tire can be under inflated. It is to be appreciated that the tire 502 is a dynamic system and can change based on various conditions. The algorithm that is used to make the various calculations can compensate for those conditions, for example, vehicle loading, vehicle speed, ambient conditions (e.g., temperature, pressure, humidity, etc.), road conditions, bumps, uneven terrain, etc., by taking average or comparative readings.

In yet another embodiment, a gas analyzer sensor can be employed within the tire to determine tire pressure. A known quantity of a gas (to be detected) can be introduced into the tire and measured with the gas analyzer during a calibration phase. The tire sensor module 504 can then determine, for example, whether the tire is over-inflated (the gas analyzer sensor "sees" fewer gas molecules), the tire is under-inflated (the gas analyzer sensor "sees" more gas molecules), etc. It can thus be understood that any suitable manner of determining tire pressure, tire rotation speed, tire balance, and/or other tire parameters with contactless sensors and/or contact type sensors is contemplated and intended to fall under the scope of the hereto-appended claims.

Figure 6:
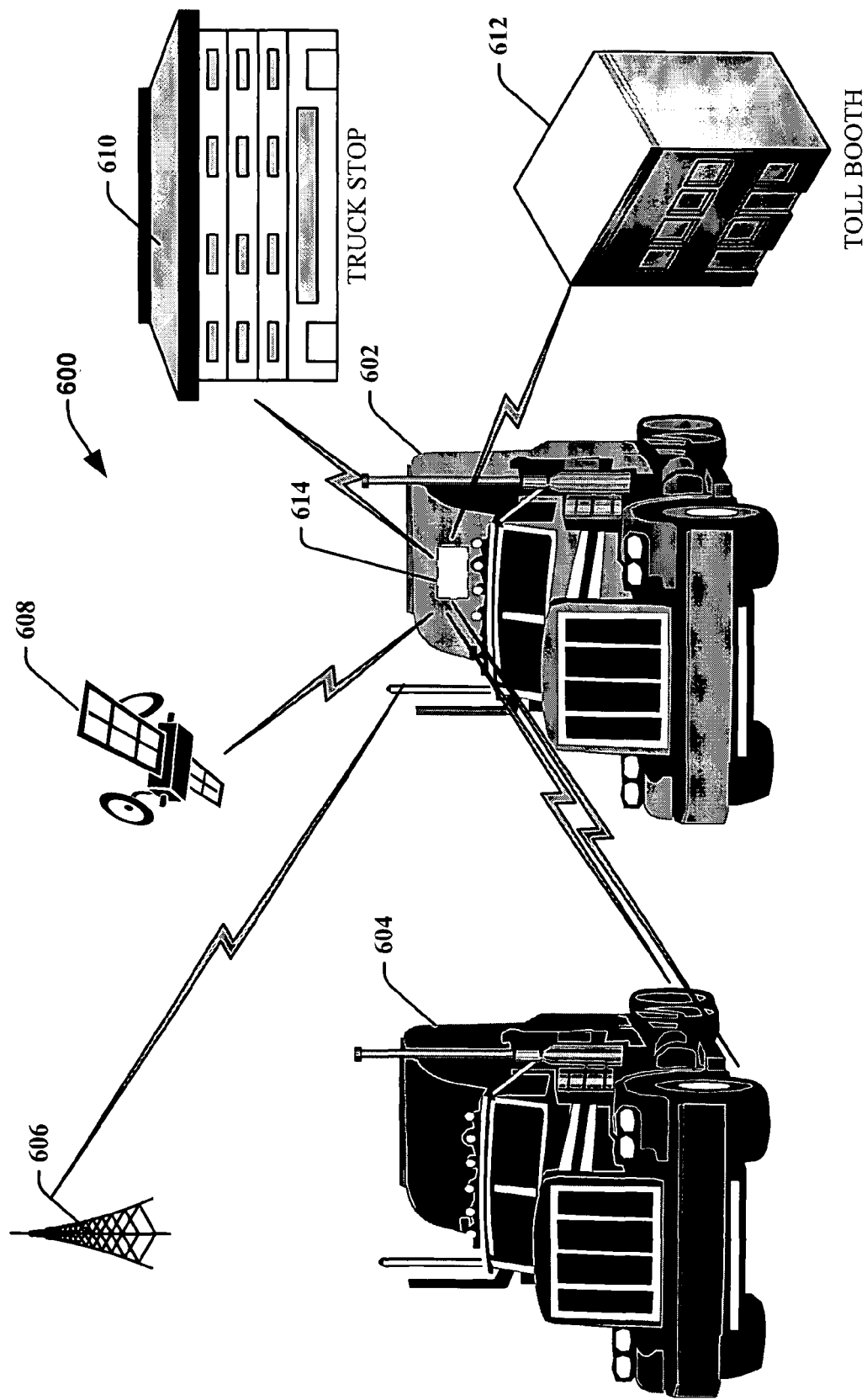
FIG. 6 is a perspective view of vehicles having tire sensor modules and a central control unit associated therewith, according to an embodiment of the invention.

FIG. 6 illustrates a system 600 that can facilitate tire monitoring in accordance with the invention. An over-the-road truck 602, specially outfitted, can include a large memory capacity, universal central control unit 614 that can receive tire data from other trucks 604, for example, and that data can be transferred to or downloaded to various outside sources. Those sources can include, for example, a cell tower 606, a satellite 608, a truck stop 610, a toll booth 612, etc. The collected tire data can be transferred utilizing a variety of mediums, hard-wire, the Internet, wireless, infra-red, Bluetooth, ultra-wide band, satellite, etc. In this way data can be transferred in real time from one vehicle to another so that tire parameters can be monitored, for example, by the federal traffic safety commission, local jurisdictions, trucking companies, etc. In this way even if a motorist ignores, for example, a tire pressure hazard light on the dashboard, the motorist can be, for example, contacted through radio dispatch, stopped at a toll booth, etc., in order to check the tire pressure, replace a tire, etc., The outside source can also include, but not be limited to, a vehicle, a rest stop, a regulatory building, a weigh station, a parking lot building, a fuel station, a maintenance shop, a supervisor, a regulatory person, a vehicle driver, a vehicle owner, a business or combinations therewith.

In one particular embodiment, the over-the-road truck 602 can be outfitted with monitoring equipment that can communicate with the other trucks 604 tire sensors modules and/or central control units only if there is exists a hazardous tire condition that requires immediate attention, for example, a tire is about to burst, a re-tread is about to come off, the vehicle is overloaded, the wind conditions require that the truck come out of service, etc. All of the data retrieved in this manner can be e.g., stored, sorted, analyzed, etc., to determine effective tire pressures, proper loading conditions, etc., in order to improve highway driving safety.

Figure 7:
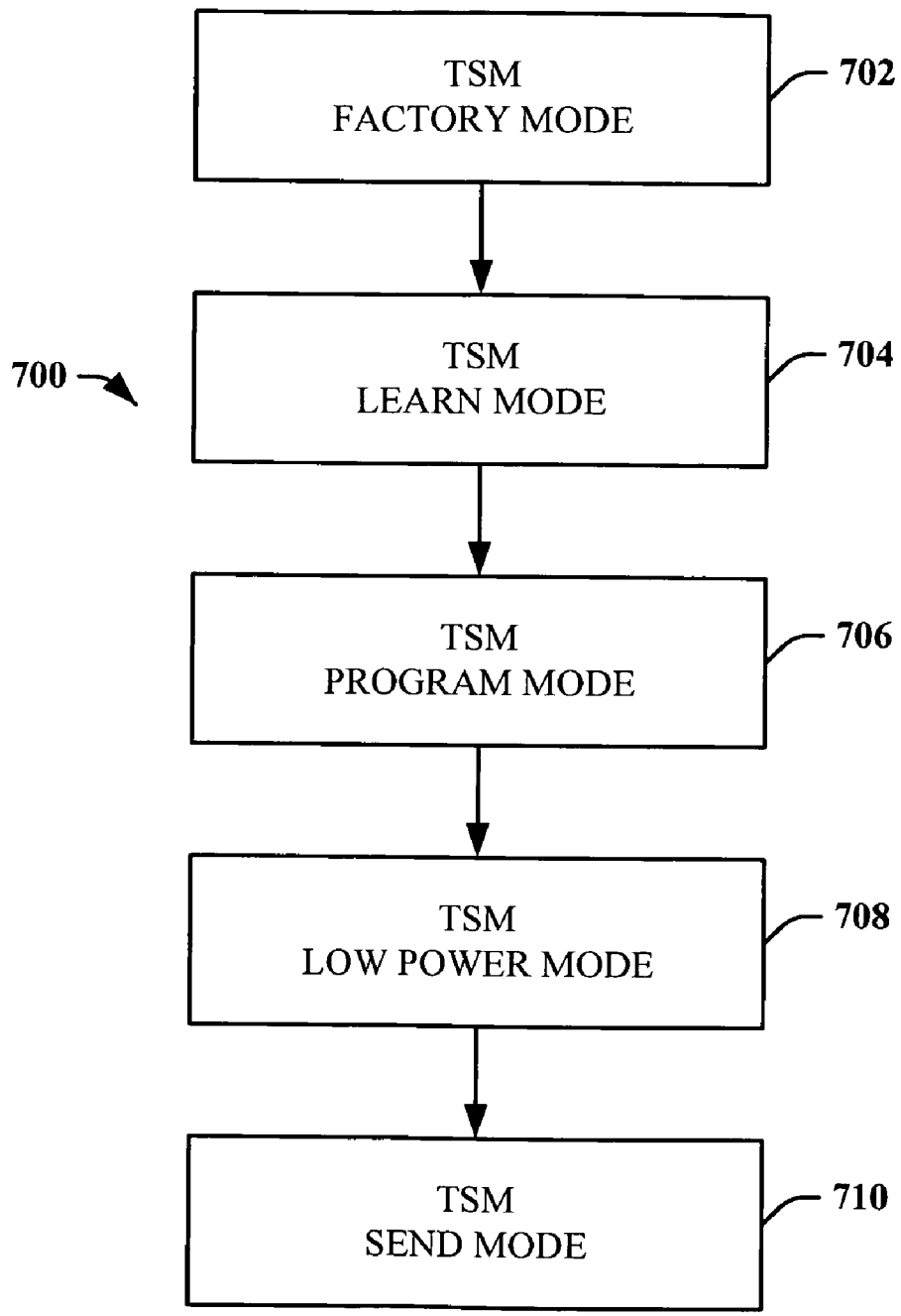
FIG. 7 is a flow chart diagram illustrating an additional act of updating predetermined time intervals of tire sensor modules according to another optional embodiment of the invention.

FIG. 7 is a flow chart diagram 700 that illustrates various modes in which the tire monitoring system 400 of FIG. 4 may reside according to one embodiment of the invention. For example, initially the tire sensor module 402 may reside within a TSM factory mode 702, wherein each of the tire sensor modules 402 associated with the vehicle are in a low current mode of operation. In the TSM factory mode 702, the low current mode of operation is maintained until a general wake-up command is transmitted by the central control unit 404 to all the tire sensor modules 402. The general wake-up command can be issued by the central control unit controller 424 and transmitted via the central control unit transceiver 422 and central control unit antenna 420. Upon receiving the general wake-up command, each tire sensor module 402 can enter the TSM learn mode 704, wherein the TSM controller 408 of each TSM 402 provide instructions for a periodic transmission be sent from each respective TSM transceiver 412 via the TSM antenna 416. In one example, each tire sensor module 402 transmits a unique identification signal that identifies the respective TSM 402, and such identification signal is amplitude modulated and transmitted on a periodic basis during the learn mode 704. Each tire sensor module 402 will continue transmitting the signal until the central control unit 404 will communicate back that the module has been identified. As will be discussed below in greater detail, the central control unit 404 performs an analysis based on the received signals from the various tire sensor modules 402 to identify both the identity and location of each of the modules.

In yet another embodiment, upon each tire sensor module 402 being identified, the tire monitoring system 400 exits the TSM learn mode 704 and enters a TSM program mode of operation 706, as illustrated in FIG. 7. In a first portion of the TSM program mode 706 the clock circuit 414 in each of the tire sensor modules 402 is synchronized to the master clock circuit 426 in the central control unit 404. Upon synchronization, the central control unit 404 can then transmit time/date information that will let each tire sensor module 402 know how long it must remain in a low power mode of operation prior to waking up for transmission of new tire data to the central control unit 404. In the above manner, in one embodiment, each tire sensor module receives a unique predetermined time interval associated with the time/date information, wherein the predetermined time intervals are different from one another and do not overlap one another in the time domain.

It should be noted that although the transmission of data to a central controller may operate according to one predetermined or programmed schedule, the time(s) at which each TSM collects the data may operate according to a completely different schedule.

In one embodiment, each of the tire sensor modules 402 then enter the TSM low power mode 708, wherein, in one example, all of the components except for the clock circuit 414 are switched off in order to reduce current draw on the tire sensor module battery 410. Then, based on the arrival of the predetermined time interval, each of the tire sensor modules 402 can selectively enter the send mode 710. That is, if the first tire sensor module received time/date data for a first time period, when that first time period arrives, it awakens into the TSM send mode while the other tire sensor modules remain in the low power mode 708. In the TSM send mode 710, the selected tire sensor module 402 activates or turns on its various components, acquires tire data via the contactless tire parameter sensor 418 (e.g., tire temperatures, pressures, positions, velocities, accelerations, torques, angles, barcode information, depths, gas properties, chemicals, forces, moments, magnetic fields, ultrasonic measurements, strains, etc.), and transmits such data to the central control unit 404 via the transceiver. In one example, the acquired tire data is frequency modulated and up-converted in the TSM transceiver 412 and transmitted via the TSM antenna 416. Upon transmission being completed, the selected tire sensor module 402 returns to the TSM low power mode 708 and awaits its next predetermined time interval.

In accordance with another embodiment of the invention, during the TSM send mode 710, after the tire data has been received at the central control unit 404, the central control unit transmits back updated time/date information that dictates the next predetermined time interval. In one example, the next predetermined time interval is the same type of interval as used previously, wherein a frequency at which the data is collected from the tire sensor modules 402 remains relatively constant. In another example, the predetermined time interval changes, for example, based on one or more characteristics associated with the vehicle in which the tire monitoring system 402 resides. For example, the central control unit 404 may receive updated vehicle speed information via the vehicle bus 430, wherein at low speeds (or in a parked condition), the frequency at which tire data is acquired and transmitted may be reduced substantially (e.g., about once per hour), while at vehicle speeds above a given threshold the tire data may be acquired and transmitted at a substantially higher frequency (e.g., about once per minute). By sending the new time/date information based on one or more vehicle characteristics, the central control unit dynamically varies the next predetermined time intervals to collect the needed data while concurrently reducing the power drawn from the various tire sensor modules 402 when such high frequency tire data collection is not needed.

In yet another alternative embodiment of the invention, when the system is acquiring tire data infrequently (e.g., once per hour), the system may account for potential changes during the TSM low power mode time frame by periodically awakening and checking if the vehicle condition (e.g., speed) has changed. If not, the tire sensor modules 402 do not see a general awaken command from the central control unit, and they then return to their low power mode 708. The periodic wake-up and check for a change in vehicle conditions may be performed at any predetermined time interval (e.g., every five (5) minutes).

Figure 8:
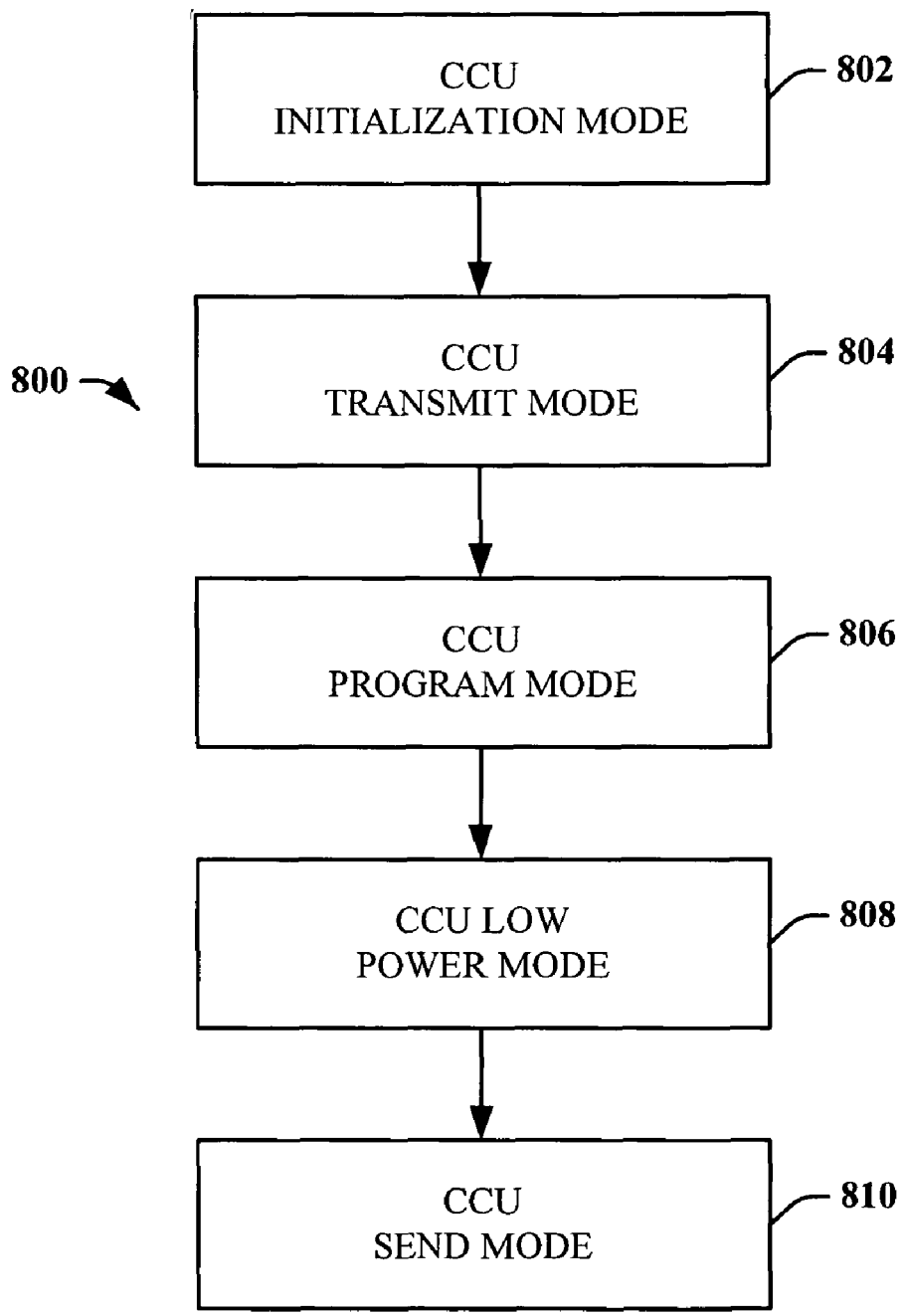
FIG. 8 is a flowchart illustrating yet another embodiment of the invention illustrating the act of updating predetermined time intervals of central control.

Turning now to FIG. 8, a method 800 of obtaining and transmitting tire data from a central control unit to an external control unit (such as the system 400 of FIG. 4, for example) is provided. Although the method 800 is illustrated and described below as a series of acts or events, it will be appreciated that the invention is not limited by the illustrated ordering of such acts or events. For example, some acts may occur in different orders and/or concurrently with other acts or events apart from those illustrated and/or described herein, in accordance with the invention. In addition, not all illustrated steps may be required to implement a methodology in accordance with the invention. Furthermore, the methods of the invention may be implemented in association with various types of tire monitoring components and systems, and any such system or group of components, either hardware and/or software, incorporating such a method is contemplated as falling within the scope of the invention.

FIG. 8 is a flow chart diagram 800 illustrating various modes in which the tire monitoring system 400, for example, of FIG. 4 can reside according to one embodiment of the invention. For example, initially a central control unit 404 may reside within a central control unit initialization mode 802, wherein the central control unit 404 associated with the vehicle is in a reduced power mode of operation and is not in communication with the tire sensor modules 402. In the central control unit initialization mode 802, the reduced power mode of operation is maintained until a general central control unit 402 wake-up command is transmitted by the external control unit 406 to the central control unit 406. The general external control unit wake-up command can be issued by the authorized external control unit 406 and transmitted via the external control unit transceiver 440 and external control unit antenna 442 to various central control units 404 stored within signal range of the external control unit 406, for example, a fleet of trucks in a yard, a fleet of taxis in a garage, school buses in a lot, etc. Upon receiving the central control unit general wake-up command, the various authorized central control units 406 can enter the central control unit learn mode 804, wherein the central control unit controller 424 of the central control unit 404 provides instructions for a periodic transmission be sent the central control unit transceiver 422 via the central control unit antenna 442. For example, the central control units 404 can each transmit a unique central control unit identification signal that identifies the central control unit 404 and a unique vehicle identification code that is associated with vehicle the central control unit is mounted on, and as such the identification signal and the unique vehicle identification code can be amplitude modulated and transmitted to the external control unit 406 during the central control unit transmit mode 704. The central control unit 404 can transmit the unique central control unit identification signal and the unique vehicle identification code when the external control unit 406 requests that the central control unit 404 do so. As will be discussed below in greater detail, the external control unit 406 performs an analysis based on the received signals from the authorized central control units 404 to identify both the identity and location of the various central control units 404 and vehicles.

In another embodiment, upon central control unit 404 and vehicle identification, the central control unit 404 can exit the central control unit transmit mode 804 and enters a central control unit program mode of operation 806, as illustrated in FIG. 8. In a first portion of the central control unit program mode 806 a central control unit clock circuit 426 in the central control unit 404 is synchronized to an external control unit master clock circuit 436 in the external control unit 406. Upon synchronization, the external control unit 406 can then transmit time/date information that will let the central control unit 404 know how long it must remain in a low power mode of operation prior to waking up for transmission of new tire data to the external control unit 406. In the above manner, each central control unit 404 for each of the unique vehicles receives a unique predetermined time interval associated with the time/date information, wherein the predetermined time intervals are different from one another and do not overlap one another in the time domain. The time interval can be based on factors, for example, the order in which the vehicles are to be released, what vehicles have the worst tire anomalies, etc. The selected central control unit 406 returns to the central control unit low power mode 808 and times out until the next predetermined time interval.

In accordance with another embodiment of the invention, during the central control unit 404 send mode 810, after the tire data has been received at the external control unit 406, the external control unit 406 can transmit back updated time/date information that dictates the next predetermined time interval. Alternatively, the central control unit 404 can transmit data to the external control unit 406 based on priority, for example, the central control unit 404 then can enter the low power mode 808, wherein, in one example, all of the components except for the central control unit clock circuit 426 are switched off in order to reduce current draw on a vehicle battery. Then, based on the arrival of the predetermined time interval, each of the tire sensor modules 402 can selectively enter the send mode 810. That is, if the first central control unit 404 received time/date data for a first time period, when that first time period arrives, it awakens into the send mode while the other tire sensor modules remain in the low power mode 708. In the send mode 810, the selected central control unit 404 activates or turns on its various components and transmits such data to the external control unit 406 via the central control unit transceiver 422. In one example, the acquired tire data is frequency modulated and up-converted in the central control unit transceiver 422 and transmitted via the central control unit antenna 420. Upon transmission being completed, the selected central control unit 404 can return to the low power mode 808 and awaits its next predetermined time interval if the vehicle remains stationary.

In accordance with another embodiment of the invention, during the send mode 810, after the tire data has been received at the external control unit 406, the central control unit transmits back updated time/date information that dictates the next predetermined time interval if the vehicle will be in the external control unit's location at that time. In one example, the next predetermined time interval is the same type of interval as used previously, wherein a frequency at which the data is transmitted from the central control unit 404 remains relatively constant.

Figure 9:
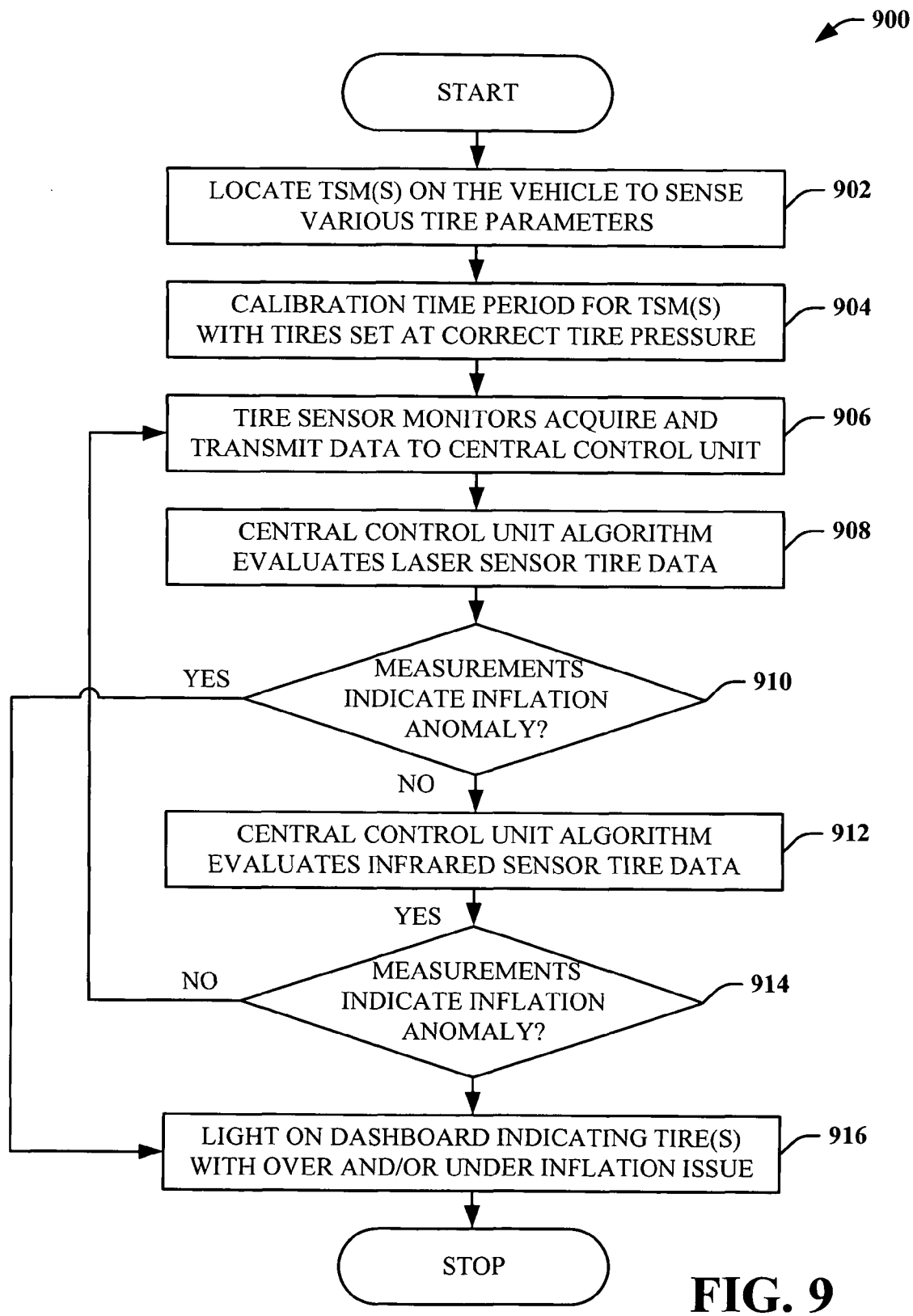
FIG. 9 illustrates a method for analyzing tire sensor module data that can be employed in accordance with another embodiment of the invention.

As alluded to above, the tire monitoring systems 100 and 500 and the methods 700 and 800 of the invention each contemplate an identification of tire anomalies in the vehicle. FIG. 9 is a flow chart diagram illustrating a method 900 of identifying whether an under inflation or over inflation condition exists in a tire in accordance with one or more embodiments of the invention. FIG. 9 will be described in conjunction with FIG. 5 in order to facilitate an understanding of this embodiment.

The method 900 begins at 902, wherein a tire sensor module 506 is located outside the tire, for example, on the vehicle frame and a tire sensor module 504 is mounted inside the tire on the tire rim. It is to be appreciated, that although the TSM 504 is shown mounted in a single location, the TSM 504, for example, can be mounted on a linear track, mounted on a circumferential track, a moveable platform, etc., so that the TSM 504 can "look" at any location of the tire. In another example, the sensors within the TSM 504 can be e.g., three contactless sensors and may be directed to sense the distance from the sensor to the tire's inside left edge, center and right edge. It is to be appreciated that although the sensors in this example are contactless, other sensors, for example, sensors in direct contact with the tire are contemplated. The method 900 then continues at 904, wherein each of the tires 502 is adjusted to the correct manufactures pressure (e.g., given the associated ambient conditions) and the sensors in the tire sensor modules 504 and 506 are calibrated for the calibrated pressure. In one example, each sensor in the tire sensor module 504 measures the average distance from the sensor to the tire surface being measured, however, other measurements may be employed and are contemplated as falling within the scope of the invention. Infrared sensors in the TSM 506 can be directed at the outer surface of the tire as shown in FIG. 5. The IR sensors can generate average mapped signals that are a function of the radiated heat from each tire. Therefore the received signals from the tire sensor modules 504 and 506 can produce different average mapped signals based on the factors they are remotely sensing at the various sensors. Since the tires parameters are changing as the vehicle moves, for example, hitting bumps, traveling on inclines, traveling on declines, etc., an algorithm can be used to evaluate changes in the average tire parameters for a predetermined period of time for calibration, e.g. ten (10) minutes. It is to be appreciated, for example, that the algorithm could also determine when the calibration is complete, how often to re-calibrate, etc.

The method 900 continues at 906, wherein the tire sensor modules 504 and 506 can transmit the various tire data to the central control unit 516 at periodic intervals, discussed supra. At 908 the algorithm of the central control unit 516 can compare the real-time average distance determined by the sensors to the inner tire surface with the calibrated average distance, on a periodic basis. For example at 910, if the average distance of the center has decreased beyond a predetermined average distance and the edge average distances increase beyond a given average distance the algorithm can determine that an over-inflation has occurred and at 916 a hazard light could be switched on in the vehicle's dashboard, directing the driver to check the front right wheel's tire pressure. The central control unit algorithm can also evaluate at 912 the tire pressure based on the IR sensors within the TSM 504. The central control unit algorithm can determine at 914 based on the average temperature profile map or matrix obtained for each IR sensor that the data indicates the various tires are under-inflated or over-inflated with respect to the readings obtained during the calibration time period 902. If the temperature readings are outside a predetermined range at 916 again a hazard light can be lit indicating a tire pressure problem. In addition the central control unit algorithm can determine whether there is a tire pressure problem based on reading from a combination of sensors, for example. In either case, the sensor measurements and/or the IR sensor measurements can determine the tire pressure is within an acceptable range. Of course, those skilled in the art will recognize many modifications may be made to this configuration, without departing from the scope or spirit of what is described herein.

Figure 10:
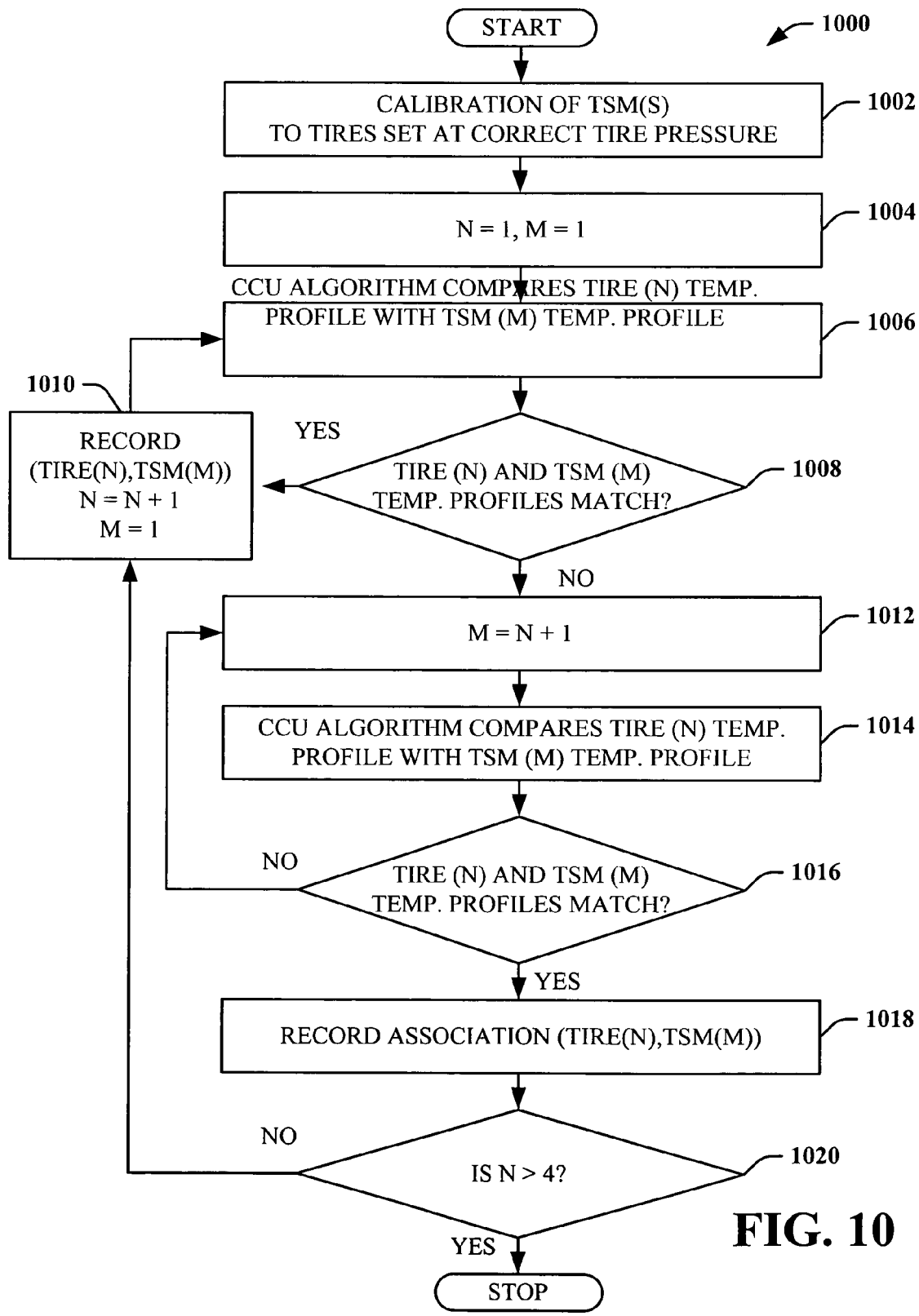
FIG. 10 illustrates a method for determining which tire is associated with a specific tire sensor module in a tire monitoring system configuration, in accordance with yet another embodiment of the invention.

Turning specifically to FIG. 10, a methodology 1000 for identifying a tire sensor module associated with a specific tire 502 is illustrated. FIG. 10 will be described along with FIG. 2 and FIG. 5 in order to aid comprehension and appreciation of this illustrative embodiment. The methodology starts at 1002, where the tire sensor modules 502 are calibrated to each of the associated, properly inflated tires 502. In this example, the TSM 504 is mounted on the vehicle, for example on, the frame, the bumper, within the wheel well, etc., and can employ, e.g., two (2) IR sensors. The IR sensors can be accurately directed, e.g., one inch, to the left and right of center of each tire 502 and during the initial calibration; each IR sensor can detect and map an average circumferential thermal profile for each tire 502.

At 1004, integers N and M can be set equal to one (1). At 1006 the central control unit algorithm can associate each tire sensor module 506 (TSM (M)), with a specific tire location (TIRE (N)). For example, considering a left front tire 206, it is associated with the left front TSM (not shown in FIG. 2), the spare tire 214 is associated with the spare tire compartment, etc. At 1004, at a predetermined time interval, for example, once per day, an algorithm in central control unit 204 compares the current tire (e.g., at average running conditions) average thermal profile for the left front tire with the stored average mapped thermal profile for the left front tire. If the average mapped temperature profiles match, the algorithm at 1010 records the pair (TIRE(N), TSM(M)) as a match and increments N by one (1) and set M=1 and continues at 1006. If the temperature profiles do not match at 1008 then M is incremented by one (1) at 1012. At 1014 the central control unit algorithm again compares the thermal profile for the left front tire with the stored thermal profile for the left front tire. If the profiles fail to match M is incremented by one (1) and 1014 is repeated. At 1018, if the profiles match the algorithm again records the pair (TIRE(N), TSM(M)). This process is repeated until all of the four tires are evaluated as indicated at 1018.

It is to be understood that this process can include the spare tire as well, in the event that all of the tires do not match up as a pair. This process can also be expanded to include vehicles have more than four tires, for example, school busses, hauling trucks, OHV earth movers, and the like.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A tire monitoring system, comprising:
at least one tire sensor module comprising one or more contactless sensors located within a tire and configured to acquire data from multiple, distinct locations on a surface of the tire and a sensor controller configured to analyze the acquired data and determine when one or more tire parameters are not within a predetermined range;
a tire sensor module transceiver configured to transmit the acquired data and determinations, wherein the sensor controller is located inside the tire and is configured to transfer the acquired data and the determinations to the tire sensor module transceiver; and
a tire sensor module antenna, wherein the tire sensor module transceiver and the tire sensor module antenna are configured to cooperatively operate to transmit the acquired data and the determinations wirelessly, and wherein an external control unit is configured to set predetermined time intervals at which the acquired data is transmitted by the at least one tire sensor module.

2. The tire monitoring system of claim 1, wherein the acquired data comprises one or more pressures, and one or more temperature measurements from the surface of the tire.

3. The tire monitoring system of claim 1, wherein the tire sensor module includes a local memory for storing data.

4. A tire monitoring system, comprising:
at least one tire sensor module comprising at least one contactless sensor, a tire sensor controller and a tire sensor module transceiver, wherein the at least one contactless sensor, the tire sensor controller and the tire sensor module transceiver are located within a tire, wherein the at least one contactless sensor is configured to acquire data associated with tire characteristics at different, distinct locations on a tire surface, wherein the tire sensor module transceiver is configured to receive the acquired data from the tire sensor controller and transmit the acquired data in a wireless fashion, and wherein an external control unit is configured to set predetermined time intervals at which the acquired data is transmitted by the tire sensor module transceiver.

5. The tire monitoring system of claim 4, wherein the at least one tire sensor module is configured to store the acquired data in a local memory, and wherein the tire sensor controller is further configured to analyze the acquired data to determine when one or more tire parameters are not within a predetermined range and store the determination in a local memory.

6. The tire monitoring system of claim 4, wherein the at least one tire sensor module is configured to communicate with a central control unit via the tire sensor module transceiver, wherein the central control unit is configured to analyze the acquired data, interpret one or more present tire conditions, and predict future tire conditions based on the analysis of the acquired data.

7. The tire monitoring system of claim 5, wherein the tire sensor module transceiver is configured to modulate or otherwise process the acquired data in response to an instruction from the tire sensor controller, and wherein the tire monitoring system further comprises:
   an external control unit located off of the vehicle, wherein the external control unit comprises a laptop computer or a PDA; and
   an antenna coupled to the tire sensor module transceiver and configured to transmit the acquired data and the determinations from the transceiver to the central control unit wirelessly.

8. The tire monitoring system of claim 5, wherein the external control unit comprises:
   an external control unit receiver configured to receive the acquired data and the determinations; and
   a memory configured within the external control unit to store the acquired data and determinations.

9. A tire monitoring system that facilitates communication with an external control unit, comprising:
   at least one tire sensor module configured inside a tire and comprising at least one contactless sensor configured to acquire data at multiple, distinct, diverse locations, wherein the at least one tire sensor module is configured to communicate the acquired data with a central control unit resident on a vehicle and the external control unit, wherein the central control unit is configured to communicate the acquired data with the at least one tire sensor module and the external control unit utilizing a transceiver in a wireless fashion, and wherein the external control unit is configured to set predetermined time intervals at which the acquired data is transmitted by the central control unit, the at least one tire sensor module, or both.

10. The tire monitoring system of claim 9, wherein the external control unit is further configured to communicate the acquired data to an outside source to allow query devices to extract acquired data from the external control unit, and wherein the external control unit is located off of a vehicle in a location comprising a laptop computer or a PDA.

11. The tire monitoring system of claim 9, wherein the central control unit is configured to perform predictive analysis based on real time analysis of the tire data to forecast when a tire anomaly will occur in the future, wherein the tire anomaly comprises one or more of an overheated tire, a tire about to delaminate, and a tire over pressurized or under pressurized.

12. A tire monitoring system that facilitates communication of tire data, comprising:
   a contactless sensor configured inside a tire, wherein the contactless sensor is configured to acquire tire data measurements at multiple, distinct, diverse positions on a tire surface; and
   a tire sensor module configured inside of the tire and configured to utilize the contactless sensor to obtain or transmit or both, the tire data measurements, wherein the tire sensor module is configured to transmit the tire data measurements to a central control unit, an external control unit, or both at predetermined time intervals which are set by the external control unit.

13. The tire monitoring system of claim 12, wherein if the one or more tire data measurements exceeds or falls below a predefined threshold, the central control unit, or the external control unit, is configured to provide at least one of the following:
   an alarm, a blinking LED, a hazard display on a vehicle dashboard, an e-mail, an action plan, a page, a phone message, a fax and a vehicle shut down within a specified time limit.

14. A method for measuring tire data, comprising:
   contactlessly acquiring tire data at multiple, distinct and diverse locations on a tire surface utilizing a tire sensor monitor comprising a single tire sensor and a tire sensor controller, wherein the tire sensor and a tire sensor controller are located within the tire;
   transmitting the tire data to a central control unit at predetermined time intervals which are set by an external control unit;
   analyzing the tire data; and
   selectively indicating a warning in response thereto.

15. The method of claim 14, wherein the warning indicates an event comprising one or more of a specific tire being overinflated, the specific tire is underinflated, the specific tire is at too high a temperature, and the specific tire is apt to delaminate.

16. A tire monitoring system, comprising:
   a single means for acquiring contactless sensor tire data at multiple, distinct, diverse tire data points on a tire surface and transmitting the tire data in a wireless fashion; and
   a means for receiving the transmitted tire pressure data and determining whether a tire meets a predetermined specification, wherein the means for determining whether the tire meets the predetermined specification comprises a sensor controller and a sensor both located within a tire, and wherein an external control unit is configured to set predetermined time intervals at which the tire data points are transmitted.

17. A tire monitoring system, comprising:
   a contactless sensor configured to acquire data from multiple, distinct, diverse locations on a surface of a tire;
   a sensor controller configured to analyze the data and determine when one or more tire parameters are not within a predetermined range;
   a sensor module transceiver for transmitting the acquired data, wherein the contactless sensor, the sensor controller, and the sensor module transceiver are located inside the tire, and wherein an external control unit is configured to set predetermined time intervals at which the acquired data is transmitted.

18. The tire monitoring system of claim 1, wherein the sensor controller provides an indication directly to a vehicle operator when the one or more tire parameters are not within the predetermined range.

* * * * *